(12) United States Patent
Allen

(10) Patent No.: US 10,688,900 B2
(45) Date of Patent: Jun. 23, 2020

(54) HIGH SPEED CIGAR HOLDER AND ASHTRAY

(71) Applicant: Cigar Riders IP Inc., Traverse City, MI (US)

(72) Inventor: James E. Allen, Traverse City, MI (US)

(73) Assignee: Cigar Riders IP Inc., Traverse City, MI (US)

( * ) Notice: Subject to any disclaimer, the term of this patent is extended or adjusted under 35 U.S.C. 154(b) by 123 days.

(21) Appl. No.: 15/728,907

(22) Filed: Oct. 10, 2017

(65) Prior Publication Data

US 2018/0105090 A1    Apr. 19, 2018

Related U.S. Application Data

(60) Provisional application No. 62/410,215, filed on Oct. 19, 2016.

(51) Int. Cl.
| | | |
|---|---|---|
| *B60N 3/12* | (2006.01) | |
| *B62J 9/00* | (2020.01) | |
| *B62J 11/00* | (2020.01) | |
| *B60N 3/08* | (2006.01) | |

(52) U.S. Cl.
CPC ............... *B60N 3/12* (2013.01); *B60N 3/083* (2013.01); *B62J 9/00* (2013.01); *B62J 11/00* (2013.01)

(58) Field of Classification Search
CPC .......... A24F 13/22; A24F 13/16; A24F 13/18; B62J 11/00; B62J 9/00; B60N 3/12
See application file for complete search history.

(56) References Cited

U.S. PATENT DOCUMENTS

| | | | | |
|---|---|---|---|---|
| 1,764,862 | A | * | 6/1930 | Vogelsang ............... A24F 13/18 131/256 |
| 5,706,832 | A | | 1/1998 | Gold |
| 5,868,143 | A | * | 2/1999 | Nielsen ................... A24F 13/22 131/175 |
| 6,234,179 | B1 | | 5/2001 | Alcaraz |
| 6,363,941 | B1 | | 4/2002 | Combs |
| 6,929,223 | B2 | | 8/2005 | Hancock et al. |
| 9,254,006 | B2 | | 2/2016 | Abdallah |

(Continued)

OTHER PUBLICATIONS

Clicgear, Clicgear Cigar Holder, Internet advertisement, 2015, 7 pages, www.amazon.com (https://www.amazon.com/Clicgear-Cigar-Holder-Golf-Carts/dp/B00AKH8F32/ref=sr_1_1), U.S.

(Continued)

*Primary Examiner* — Michael H. Wilson
*Assistant Examiner* — Dionne W. Mayes
(74) *Attorney, Agent, or Firm* — Northern Michigan Patent Law PLC

(57) ABSTRACT

A portable cigar holder for holding both a lit cigar and an extinguished stub at the same time, configured to be mounted on a support in moving vehicle. The cigar holder comprises a vertical heat-resistant rubber tube with a resilient tubular sidewall and an open upper end, a metal cup connected to or inserted in a lower end of the tube, and a pair of splits formed in opposing sides of the resilient sidewall. The splits define horizontally spaced vertical cigar-clamping slots with resiliently serrated side edges, the slots terminating at their lower ends above the rim of the metal cup.

9 Claims, 5 Drawing Sheets

(56) References Cited

U.S. PATENT DOCUMENTS

2003/0084911 A1 8/2003 McGraw
2007/0235047 A1 10/2007 Long
2007/0251534 A1 11/2007 Raybum
2010/0139673 A1 6/2010 Miller
2015/0164137 A1 6/2015 Shields, Sr.

OTHER PUBLICATIONS

JP Lann, JP Lann Golf Cigar Holder Clip for Golfers, Internet advertisement, Jun. 2016, www.amazon.com (https://www.amazon.com/JP-Lann-Golf-Holder-Golfers/dp/B00LGKZ0NU/ref=cm_cr_arp), U.S.
Stinky Cigar Ashtrays, Stinky Cigar Ashtrays, Car, Internet advertisement, 2014, www.amazon.com (https://www.amazon.com/Stinky-Cigar-Ashtrays-CA-ST-AUTO-Car/dp/B00BDS62JQ/ref), U.S.

* cited by examiner

HIGH SPEED CIGAR HOLDER AND ASHTRAY

RELATED APPLICATIONS/PRIORITY BENEFIT CLAIM

This application claims the benefit of U.S. Provisional Application No. 62/410,215, filed Oct. 19, 2016 by the same inventor (Allen), the entirety of which provisional application is hereby incorporated by reference.

FIELD

The subject matter of the present application is in the field of portable cigar holders configured for removable attachment to various supports, especially in vehicles.

BACKGROUND

Portable cigar holders are popular for smokers who need a place to put a lit cigar while otherwise engaged, for example while golfing or operating a vehicle (boat, golf cart, motorcycle, etc.). Such cigar holders appear to generally fall into two basic types, cup type and clamp type, often provided with a clip or similar device for temporarily attaching them to a stable surface. Cup type cigar holders generally consist of cups designed to hold a lit cigar vertically, ash-end up, and may provide a heat resistant base for stubbing the cigar out when it is finished. Clamp type cigar holders generally consist of spring-biased clamping jaws, with or without serrations, for holding a lit cigar horizontally.

One prior cigar holder uses a short length of durable rubber tubing having an open horizontal bore adapted to fit snugly over and protrude from a short horizontal tube-end on a golf cart frame. A smooth, rounded, upward-facing cutout in the tubing sidewall intercepts the bore at right angles and is adapted to receive a cigar in a horizontal orientation, perpendicular to the rubber tubing and the tube-end on the golf cart frame.

In the present inventor's opinion, prior cigar holders generally are unsatisfactory for use on vehicles in high speed, high vibration, long duration riding environments, especially where it may be desired to smoke multiple cigars in a row and where space is at a premium.

BRIEF SUMMARY

The present invention is a cigar holder especially designed for high speed, high vibration riding environments, such as found on a motorcycle.

In general, the inventive holder comprises a rigid heat-resistant cup coaxially topped or surrounded with an upwardly extending vertical tube of a flexible, heat-resistant, silicone type rubber. The tube sidewall is split vertically downward from its open upper end to define a pair of opposed, aligned slots terminating at or (preferably) above the rim of the cup. The edges of the slots are serrated or toothed. In a further form, the tube has a constant diameter or width, and the slot has a V-shape wider at the top and narrower at the bottom to more easily accommodate a wide range of cigar ring gauges. In the preferred form the cup and rubber tube are cylindrical, although other tubular cross-sections are possible.

The overall height of the main body tube portion of the holder (cup plus split rubber tube) is sufficient to enclose the majority of an unlit, un-smoked cigar placed vertically in the holder. The diameter of the cup is greater than the width of the slots at their widest point.

In a further preferred form, the depth of the cup and any un-slotted portion of the rubber tube sidewall below the slots is sufficient to contain a cigar stub so that it does not interfere with a fresh cigar held horizontally in the slots above it.

In a further form, the cigar holder main body (cup and coaxial rubber tube) includes an attachment base configured to allow the holder to rest more stably in a vertical position on a flat surface.

In a further form, a clip or similar attachment device is either permanently or removably secured to the cigar holder main body tube or to the attachment base to optionally suspend the cigar holder from a raised support. In yet a further form, the attachment base comprises a tubular recess for seating a bottom portion of the heat-resistant cup and/or the coaxial rubber tube.

It should be understood that terms of orientation and alignment, such as "vertical", "horizontal", and "coaxial", for example, should be construed generally, as including orientations and alignments substantially so, rather than absolutely or perfectly so, given the natural variation in manufacturing and assembly, mounting locations, and user mounting preferences.

These and other features and advantages of the invention will become apparent from the detailed description below, in light of the accompanying drawings.

DETAILED DESCRIPTION

Figure 1:
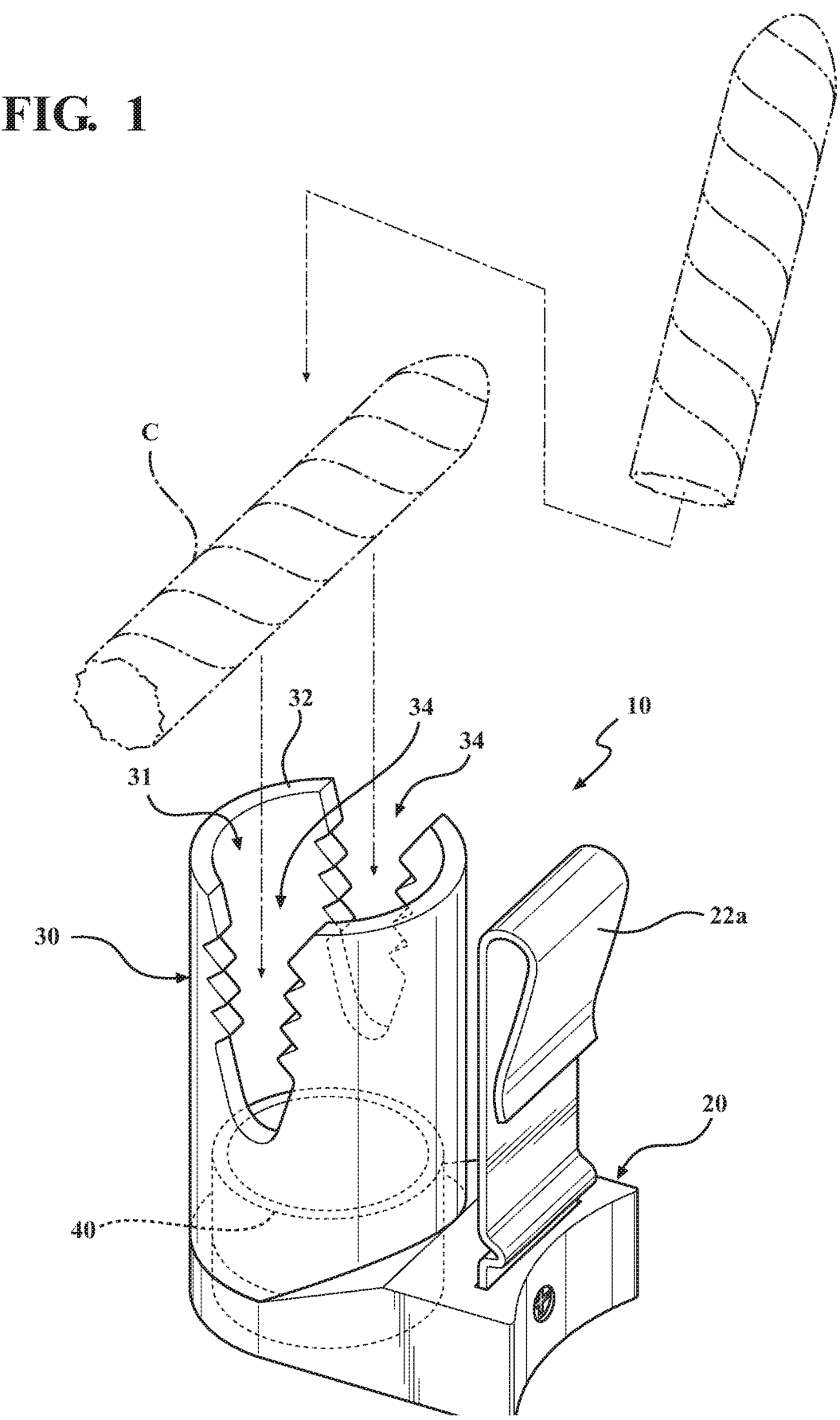
FIG. 1 is a rear perspective view of an example cigar holder according to the invention, with a cigar shown in phantom lines in a vertical storage position and a horizontal insertion position.
Figure 2:
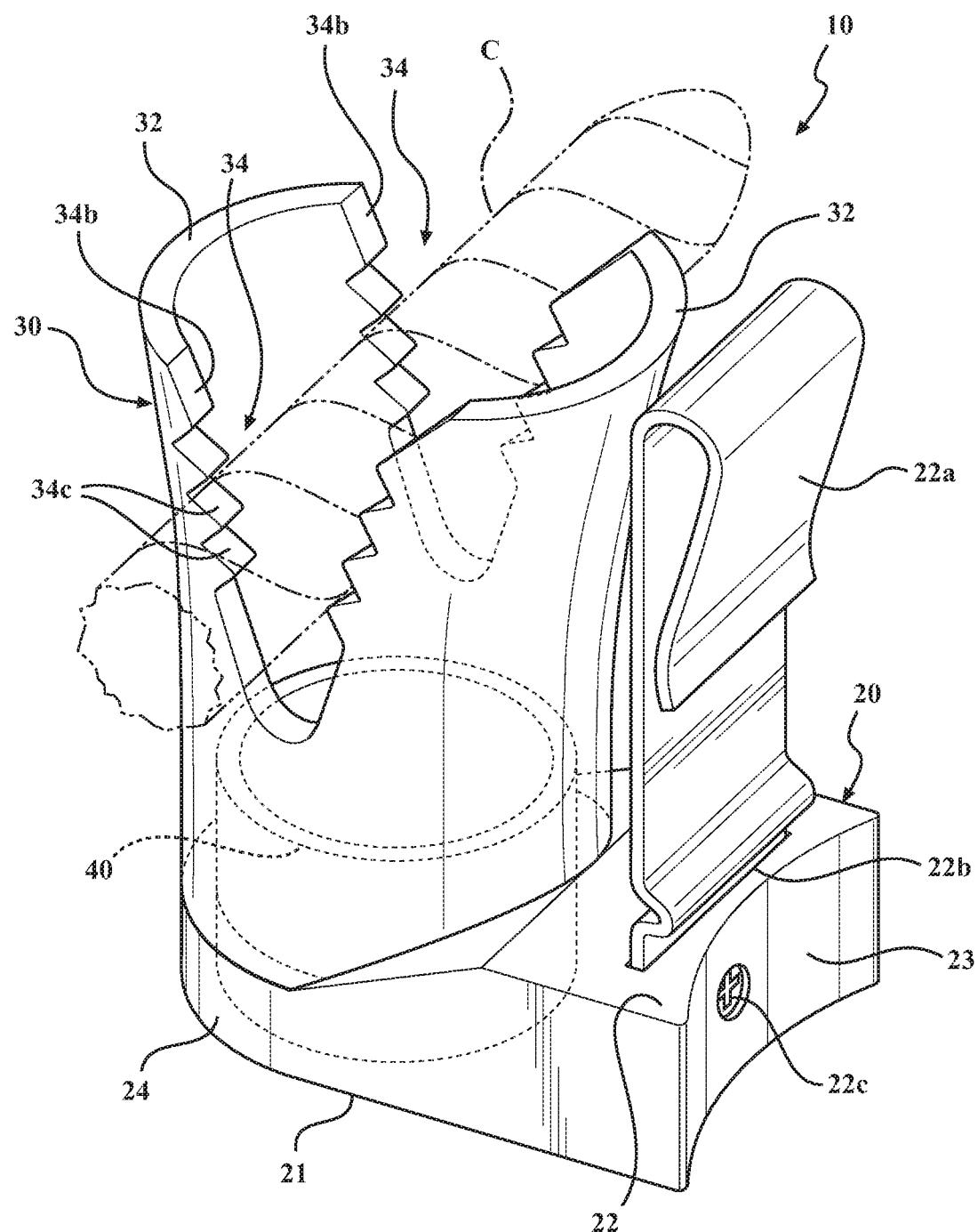
FIG. 2 is similar to FIG. 1, showing the horizontal cigar inserted fully into the holder.
Figure 3:
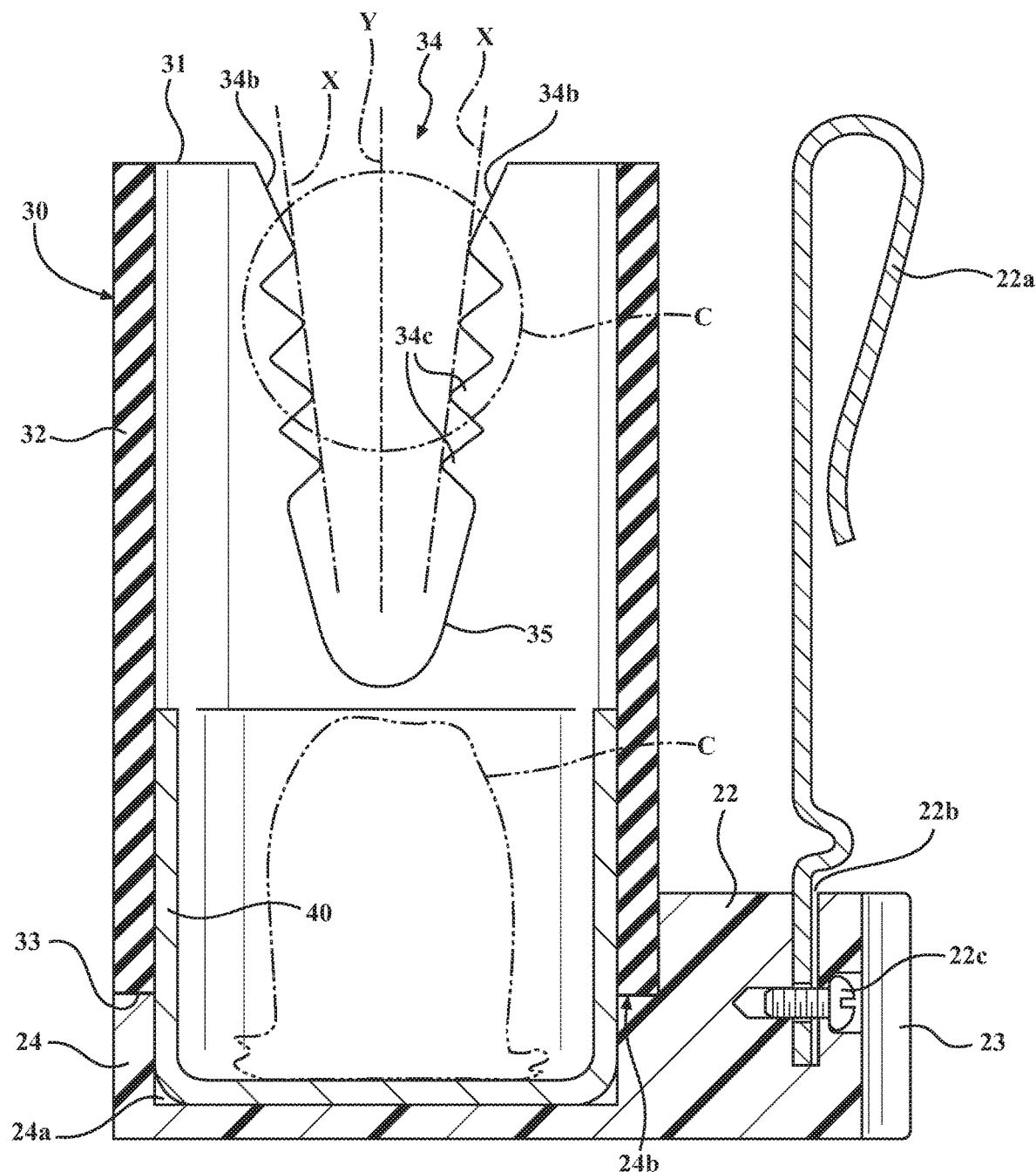
FIG. 3 is a cross-section side elevation view of the holder of FIG. 2, showing a cigar stub resting vertically in the lower cup portion of the holder and a lit cigar held horizontally in the upper tube portion of the holder above the stub.

Referring first to FIGS. 1-3, a cigar holder 10 is shown in exemplary form in order to teach how to make and use the claimed invention. Holder 10 comprises an attachment base 20, a flexible tube 30 of heat-resistant rubber material, and a heat-resistant cup 40 coaxially located at or in the bottom of tube 30.

In the illustrated example, base 20 is made from a durable rigid plastic material (e.g., nylon or polyethylene), tube 30 is made from a silicone type rubber resistant to melting at the temperatures reached by a lit cigar, and cup 40 is made from a lightweight metal such as aluminum. The material choices for the components of holder 10 may vary, and those skilled in the art will be aware of suitable equivalents.

As best shown in FIGS. 2 and 3, attachment base 20 includes a flat bottom 21, a rear stem portion 22 and a front tube-holding portion 24. Rear stem portion 22 provides a finger grip when the holder 10 rests on bottom 21 on a flat surface, and includes a suspension device such as a permanent-fixed or removable clip or clamp 22a connected, for example, in a slot 22b and secured with a screw 22c through bore. A rear face 23 of the stem portion 22 may be contoured to mate with a similarly shaped surface on a vehicle, such as a rounded portion of the dash or fairing on a motorcycle or golf cart.

Figure 5:
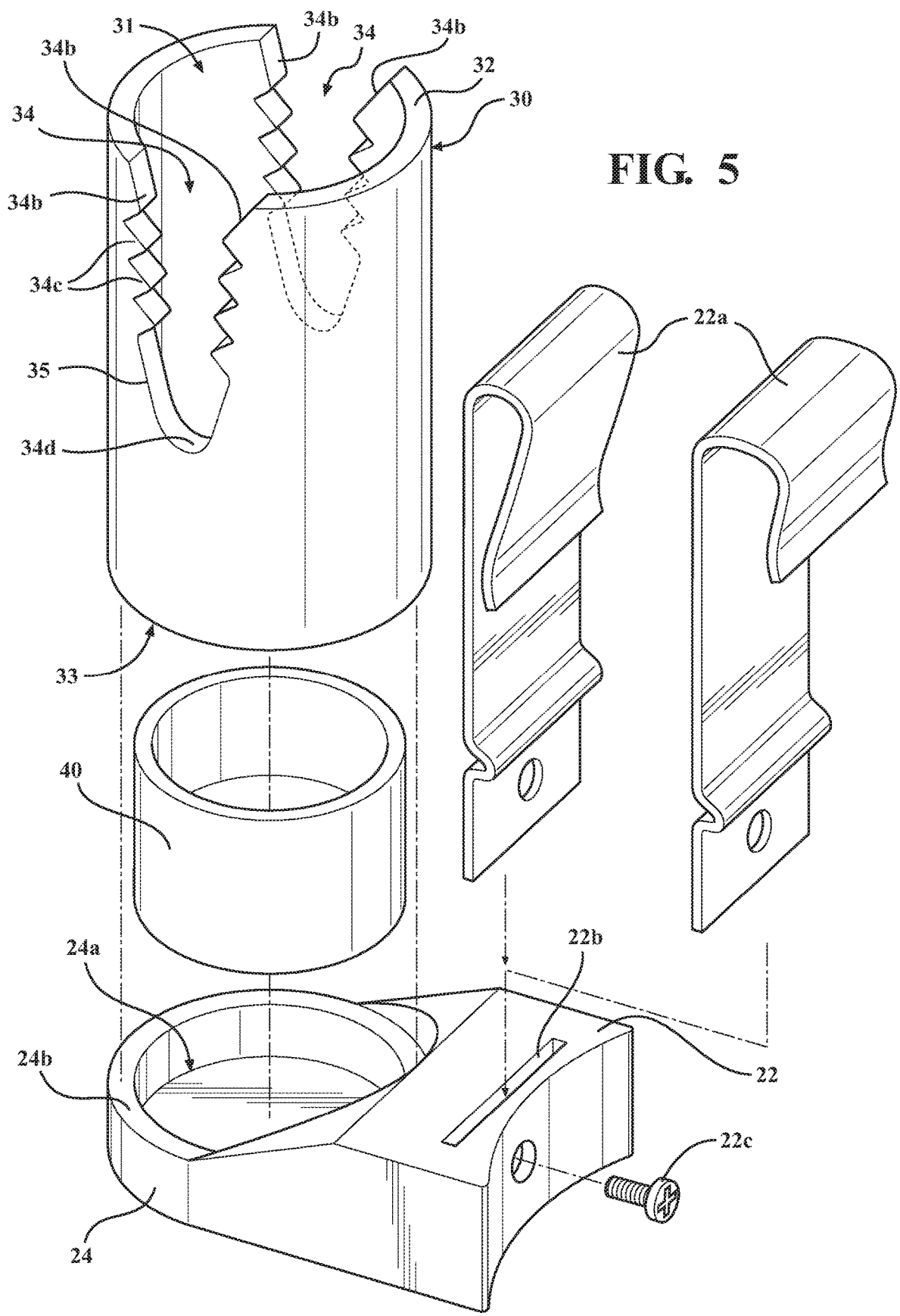
FIG. 5 is an exploded view of the holder of FIG. 1, showing details of its attachment base and removable connector options.

Referring to FIG. 5, tube-holding portion 24 of base 20 in the illustrated example includes a recess 24a configured to receive the bottom (preferably flat) end of rigid cup 40, and a peripheral raised shoulder 24b following the contour of the recess 24a for receiving a lower end of rubber tube 30. Tube 30 and/or cup 40 may be friction-fit into shoulder 24b and recess 24a, or they may be more firmly or permanently secured with adhesive or mechanical connectors or by molding.

Referring again generally to FIGS. 1-3, the combined height of the main cigar holder body comprising tube 30 and cup 40 is preferably sufficient so that an unlit cigar C can be reasonably securely stored inside in a vertical orientation, for example with more than half of its length contained in the cup/tube combination.

While rubber tube 30 is shown as open at both its upper end 31 and lower end 33, lower end 33 could be closed so that it covers the bottom of cup 40 with a layer of rubber if the tube is of a smaller diameter than the cup and inserted therein, provided the rubber is sufficiently heat-resistant to withstand the temperature of the lit end of the cigar. Alternately, cup 40 could be formed with an upper end configured to securely mount the lower end 33 of tube 30 around its rim, for example with an annular groove or slot formed in the upper edge of the cup if the cup were to be provided with a thickened sidewall, so that tube 30 "tops" the cup as an extension of the cup sidewall rather than coaxially surrounding the sidewall of the cup as pictured.

Referring now especially to FIG. 2, the sidewall 32 of tube 30 is formed of a rubber material that allows it to flex and deform at least slightly under pressure but otherwise hold its shape. Sidewall 32 is slotted on opposite sides on a horizontal axis generally parallel to the face of clip 22a, defining a pair of aligned, opposed slots 34 with open upper ends 34a at the upper end of tube 30. Slots 34 include opposing side edges 34b with flexible teeth or serrations 34c formed at least partially along their length. The lower ends 34d of the slots 34 may include enlarged relief areas 35 to help side edges 34b flex apart without distortion when a cigar with a ring gauge larger than the spacing between the side edges 34b (and teeth 34c) is inserted in the slots.

Side edges 34c are in the illustrated example are preferably angled away from one another relative to vertical axis Y, the angle represented by lines X running along the tips of teeth 34c to form a moderate V-shape between them in their normal, un-flexed state.

Figure 4:
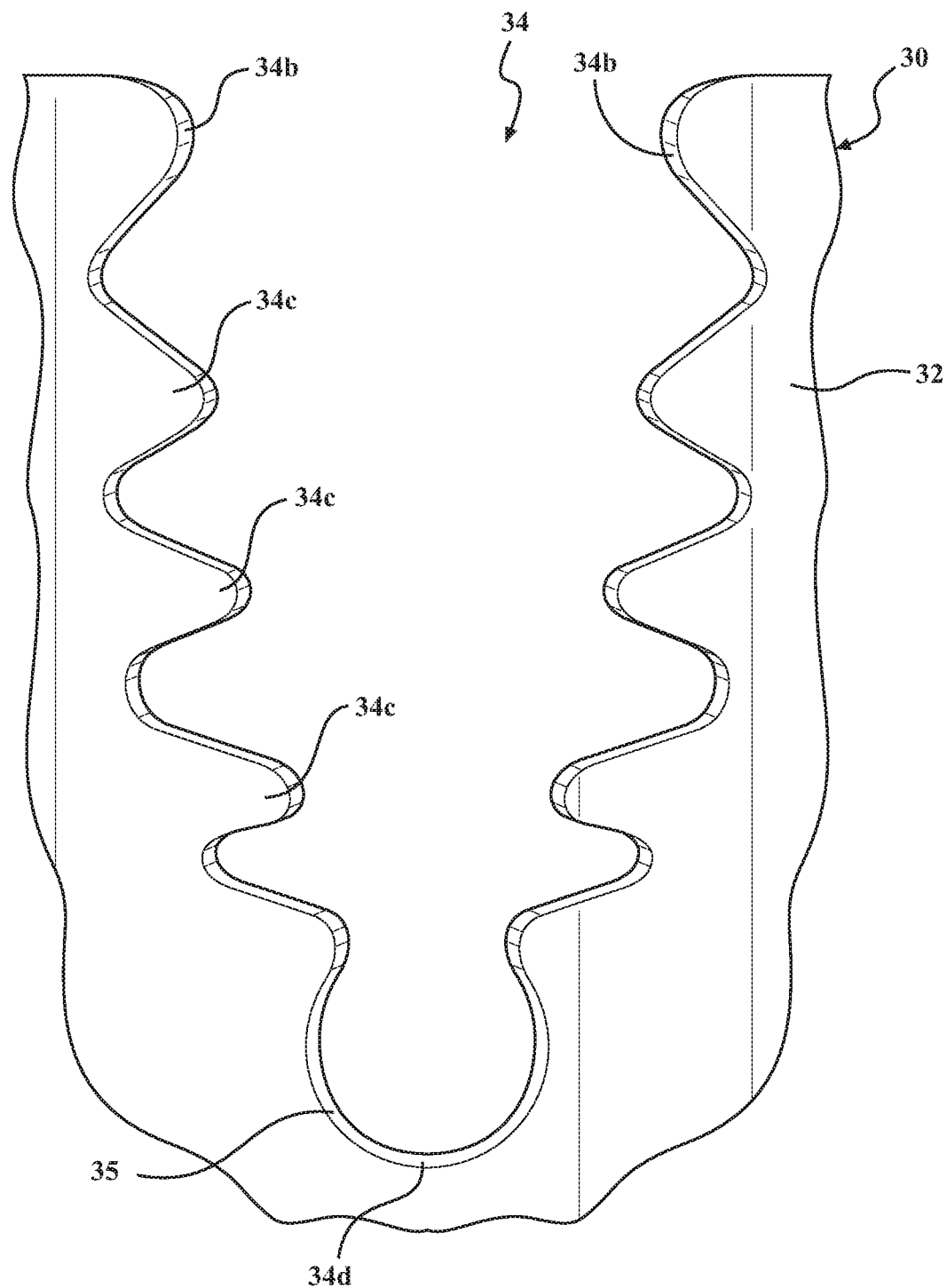
FIG. 4 is a detail of a modified slot and tooth configuration in the holder sidewall slots.

Teeth 34c formed in tube sidewall 32 may be uniform in shape and size as shown in FIGS. 1-3, or they may vary in shape and/or size along the length of their respective side edges 34b in slots 34 as shown in FIG. 4. The teeth shape embodiment of FIG. 4 provides the holder 10 with improved ability to accommodate cigars ranging in size, for example from 30 ring gauge up to a 70 ring gauge. The edges and tips of teeth 34c in FIG. 4 are more rounded than the perpendicular flat edges and triangular pointed tips of teeth 34c in FIGS. 1-3, reducing puncturing or tearing of the cigar wrapper while increasing their ability to hold a cigar under high vibration and high wind conditions.

Referring now to FIG. 5, cigar holder 10 is shown exploded into its constituent parts, including two different clip options 22a configured to fit onto various features on a vehicle to suspend holder 10. While two spring metal clips 22a configured for suspending the holder 10 vertically from vertical edges of various supporting objects or surfaces under spring tension are shown as examples, it will be understood that other forms of clip or clamping device could be used at 22a, including but not limited to magnetic attachments, adhesive members, hooks, C-shaped clamping heads for engaging tubular members, and threaded connectors. Also, while in the illustrated example clips 22a are shown as being interchangeably and removably connected to stem portion 22 of base 20 by inserting their lower ends into slot 22b, other forms of removable or permanent attachment or fixation are possible.

In FIGS. 1-5 the main tubular cigar holding body portion of holder 10 comprising tube 30 and cup 40 is shown combined with attachment base 20 for increased stability when resting on flat surfaces, and for a strong, simple platform for mounting clip 22a so that the holder can be suspended vertically from various surfaces. It should be understood, however, that tubular body portion 30, 40 of the cigar holder could be used on its own, without a separate or enlarged base portion 20, where the bottom of cup 40 is sufficiently flat and wide to allow it to rest stably on a flat surface. Additionally, a clip or similar vertical suspension device such as that shown at 22a or equivalent could be directly attached to the tubular body 30/40 so that the tubular cigar holding portion could be suspended directly from a dashboard, fairing, handlebar, etc. Alternately, an enlarged or widened base 20 could be integrally formed or molded with tubular body portion 30/40 rather than formed as a separate piece.

While the holder 10 has been described above as a cigar holder, it is also possible to size and shape the cigar-engaging portions of the holder to hold other equivalent rolled tobacco products such as cigarettes, cigarillos, and the like. For example, the width of slots 34 and/or the size and spacing of teeth 34c may be made smaller to accommodate rolled tobacco products smaller in diameter or ring gauge than a typical cigar. The term "cigar" used herein should accordingly be understood to include such equivalent rolled tobacco products.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A portable cigar holder comprising:
   a vertical flexible tube of a resilient, flexible, heat-resistant rubber material, and a rigid heat-resistant cup of lesser height than the vertical flexible tube and connected coaxially to a lower end of the vertical flexible tube to define a cigar-receiving tubular body comprising an upper flexible tubular portion and a lower rigid tubular portion, the cigar-receiving tubular body sufficient to enclose a majority of an unsmoked cigar placed vertically therein, the vertical flexible tube having an open upper end spaced above the cup and a first un-flexed diameter;

the vertical flexible tube comprising a cylindrical flexible tubular sidewall above the rigid cup, the sidewall being split vertically downward from its open upper end on opposite sides to define two aligned and horizontally-spaced substantially V-shaped slots with open upper slot ends and with lower slot ends terminating at or above a rim of the rigid cup, and further to define two opposing flexible substantially semi-cylindrical vertical sidewall halves corresponding to the slots above the rigid cup capable of flexing apart from one another outwardly beyond the un-flexed first diameter independently of the rigid cup; and wherein, each substantially V-shaped slot comprises a pair of spaced opposing serrated flexible edges formed in the cylindrical flexible tubular sidewall, the opposing serrated flexible edges having a wider spacing at the open upper slot ends and a narrower spacing toward the lower slot ends corresponding to a range of cigar ring gauges such that the opposing serrated flexible edges and the opposing vertical substantially semi-cylindrical sidewall halves of the vertical flexible tube above the rigid cup may flex outwardly independently of the rigid cup when a cigar with a ring gauge larger than at least one of the cigar ring gauges in the range is inserted in a horizontal orientation into the slots between the opposing serrated flexible edges a distance sufficient to resiliently clamp the cigar therebetween; and, further wherein each of the opposing flexible substantially semi-cylindrical vertical sidewall halves comprises a horizontally-spaced set of the serrated flexible edges from each of the substantially V-shaped slots, the horizontally-spaced set of the serrated flexible edges capable of flexing horizontally apart from one another on their respective flexible substantially semi-cylindrical sidewall halves.

2. The portable cigar holder of claim 1, wherein each substantially V-shaped slot has a V-shape as defined along tips of the opposing flexible serrated edges.

3. The portable cigar holder of claim 1, wherein the rigid cup and the vertical flexible tube are cylindrical.

4. The portable cigar holder of claim 1, wherein the rigid cup has a substantially flat bottom capable of resting on a flat surface.

5. The portable cigar holder of claim 1, wherein the holder further includes an attachment base comprising a tube-holding portion including a front recess for receiving a lower end of the cigar-receiving tubular body, and a rear stem portion including a suspension device for vertically suspending the holder from an object or surface, and the attachment base further comprising a substantially flat bottom surface of greater area than the lower end of the cigar-receiving tubular body.

6. The portable cigar holder of claim 1, wherein the vertical flexible tube has a constant unflexed first diameter or width.

7. The portable cigar holder of claim 6, wherein each substantially V-shaped slot has a V-shape as defined along tips of the opposing flexible serrated edges.

8. The portable cigar holder of claim 1, wherein a cigar stub space is defined between a bottom of the rigid cup and the lower slot ends of sufficient height to store a cigar stub below the V-shaped slots.

9. The portable cigar holder of claim 1, wherein the rigid cup has a diameter greater than a width of the substantially V-shaped slots at their widest point.

* * * * *